3,300,287
PETROLEUM FUELS CONTAINING ANTIBIOTIC COMBINATIONS
George M. Savage, Kalamazoo, Mich., assignor to The Upjohn Company, Kalamazoo, Mich., a corporation of Delaware
No Drawing. Filed Sept. 12, 1963, Ser. No. 308,375
5 Claims. (Cl. 44—50)

This invention relates to improved petroleum distillate fuels, more particularly petroleum distillate fuels improved by inhibition of microbial action therein.

In storage, transportation, transfer, and use of petroleum distillate fuels, water practically always becomes a contaminant. In storage tanks, although the water is present in a minor proportion in reference to overlaying fuel per se, such proportion is substantial. Microbes, including bacteria and fungi, are acquired by the fuel from air, tanks, trucks, pipe lines, the water, and like sources of contamination. Propagation of the microbes and their metabolic processes in the water-contaminated fuel, especially at the interface of the fuel and water, results in gums, sludges, and like formed products. Such products are deleterious in fouling fuel transfer systems, filters, combustion engine parts and similar equipment utilized in the handling and combustion of the fuels. Such products are especially harmful when they have an acidic nature which acelerates corrosion of tanks, pipe lines, engine parts, and the like, composed of aluminum and iron.

It is therefore an object of this invention to provide improved petroleum distillate fuels which are inhibited against microbial action of a deleterious nature. Beneficial results are obtained by preventing and retarding microbial propagation. The invention provides a petroleum distillate fuel containing a combination of antibiotics. The term petroleum distillate fuel means gasoline, kerosene, diesel fuel, jet engine fuel, and similar petroleum distillate products. Typical jet engine fuels are naphthenic kerosene, for example, JP–1; gasoline-kerosene blends such as JP–3, JP–4, JP–5 and ASTM type B; kerosene types such as JP–6, ASTM type A, and ASTM type A–1. The combination of antibiotics is a member selected from the group consisting of novobiocin sodium and neomycin salicylidene, novobiocin and circulin sulfate, porfiromycin and neomycin salicylidene, and porfiromycin and circulin sulfate.

It has been found that the operative range of the antibiotic combination is from about one to about 10 parts per million calculated on a basis of total mass of fuel and water. In the antibiotic combination the ratio of the individual components ranges from 1:10 to 10:1 by weight, with 1:1 preferred.

The manner of addition of the antibiotic combination to the fuel is not critical. However, the method of addition must be such as to ensure distribution of the combination throughout the whole mass of said fuel and accompanying water. The combination can be added as a solution, dispersion, and suspension in a suitable liquid, for example, water, ethanol, methanol, and the fuel itself. The concentration of the combination in said liquid should be the maximum consistent with a fluidity adequate for ready addition, as by metering, into the fuel mass. A convenient manner of addition is as the solid combination within a perforated aluminum leach, which is suspended in the fuel. Water extracts the combination. It is preferred to use mixing means to provide uniform distribution of the antibiotic combination in the mass of fuel and water. Such means are, for example, air jets located in situ, explosion-proof mixers and stirring devices, and the like. Since the water content is minor in relation to that of the fuel per se and since the antibiotic combination is more soluble in the water than in the fuel, the concentration of the combination in the water phase usually ranges from about 20 to 200 parts per million. The activity of such concentration provides effective microbicidal action at the fuel-water interface, the probable locale of incipient formation of gums, sludges, and like undesirable reaction products.

A practical means for the addition of the antibiotic combination to the fuel is in combination with an anti-icer. Consequently the invention includes an article of manufacture formed of a anti-icer and the antibiotic combination, which will produce anti-icing and antimicrobial action when introduced into petroleum distillate fuels. A particularly advantageous anti-icer is composed of 90 parts by weight of ethylene glycol monomethyl ether and 10 parts by weight of glycerol. The anti-icer is usually added to the fuel in a volume equal to $\frac{1}{10}$ of that of the fuel. Therefore, the antibiotic concentration in the anti-icer ranges from about 10 to 100 p.p.m.

A composite was prepared by pooling 10 different water bottom samples from tanks containing jet engine fuels. The composite was mixed with an equal amount of Bushnell-Hass medium. The mixture was overlaid with JP–4 fuel. Propagation of the microbial population was allowed to proceed at room temperature to yield a seed culture.

Antimicrobial tests were conducted in samples prepared from the following ingredients:

Jet fuel, JP–4, ml. _____ 160
Sterile medium, Bushnell-Haas, ml. _____ 36
Seed culture, ml. _____ 4
Antibiotic combination, gm. _____ 0.04

The first three above ingredients are mixed, the antibiotic combination is added, and the whole is well mixed and allowed to settle. Propagation is allowed to proceed at room temperature for 8 days at which time the samples are assayed to determine microbial counts per ml. of the water phase. The following results were obtained:

| Added Antibiotic | Count—Sample Only | Count—Sample Plus Al. Coupon [1] | Count—Sample Plus Iron Coupon [1] |
| --- | --- | --- | --- |
| A. Novobiocin sodium | $10 \times 10^6$ | $17 \times 10^6$ | $15 \times 10^6$ |
| B. Neomycin salicylidene | $30 \times 10^6$ | $27 \times 10^6$ | $40 \times 10^6$ |
| C. Novobiocin | $68 \times 10^6$ | $42 \times 10^6$ | $78 \times 10^6$ |
| D. Circulin sulfate | $47 \times 10^6$ | $57 \times 10^6$ | $29 \times 10^6$ |
| E. Novobiocin sodium plus neomycin salicylidene, 1:1 | 0 | 0 | $3 \times 10^6$ |
| F. Novobiocin plus Circulin sulfate, 1:1 | 0 | 0 | $40 \times 10^2$ |
| G. Porfiromycin plus Neomycin salicylidene, 1:1 | 0 | 0 | 0 |
| H. Porfiromycin plus Circulin sulfate, 1:1 | 0 | 0 | 0 |
| I. None | $5 \times 10^6$ | $14 \times 10^6$ | $5 \times 10^6$ |

[1] Added to each sample of 200 mls. in the form of a metallic strip.

These results show that the fuel-antibiotic combination is not only inhibitory but indeed microbicidal for the entire spectrum of microbes in fuel tank water bottoms. Especially advantageous and beneficial are the microbicidal effects in the presence of aluminum and iron. Sludge or gummy deposits were not observed in the various zero count samples.

The following examples set forth the manner and process of making and using the invention and the best mode contemplated by the inventor of carrying out his invention but are not to be construed as limiting.

*Example 1.—Gasoline*

An antibiotic combination is prepared by blending by weight one part of novobiocin sodium and 10 parts of neomycin salicylidene. One part of said combination is added to one million parts of gasoline to provide a composition wherein microbial propagation is prevented and sludge and gum formation is minimal.

Similar beneficial results are obtained with said antibiotic combination wherein the ratio of novobiocin sodium and neomycin salicylidene is 1:5, 1:1, 5:1, and 10:1.

*Example 2.—Kerosene*

An antibiotic combination is prepared by blending by weight one part of novobiocin and 10 parts of circulin sulfate. Two and one-half parts of said combination are added to one million parts of kerosene to provide a composition wherein microbial propagation is retarded and sludge and gum formation is minimal.

Similar beneficial results are obtained with said antibiotic combination wherein the ratio of novobiocin to circulin is 1:5, 1:1, 5:1, and 10:1.

*Example 3.—Diesel fuel*

An antibiotic combination is prepared by blending by weight one part of porfiromycin and 10 parts of neomycin salicylidene. Five parts of said combination are added to one million parts of diesel fuel to provide a composition wherein microbial propagation is prevented and sludge and gum formation is minimal.

Similar beneficial results are obtained with said antibiotic combination wherein the ratio of porfiromycin to neomycin salicylidene is 1:5, 1:1, 5:1 and 10:1.

*Example 4.—Engine fuel JP–1*

An antibiotic combination is prepared by blending by weight one part of porfiromycin and 10 parts of circulin sulfate. Seven and one-half parts of said combination are added to one million parts of engine fuel JP–1 to provide a composition wherein microbial propagation is prevented, sludge and gum formation is minimal and fouling of transfer and combustion equipment are absent.

Similar beneficial results are obtained with said antibiotic combination wherein the ratio of porfiromycin to circulin is 1:5, 1:1, 5:1, and 10:1.

*Example 5.—Engine fuel JP–4*

An antibiotic combination is prepared by blending by weight one part of novobiocin sodium and 10 parts of neomycin salicylidene. Ten parts of said combination are added to one million parts of engine fuel JP–4 to provide a composition wherein microbial growth is absent, deleterious sludge and gum formation are not encountered, and difficulties in combustion equipment are prevented.

Similar beneficial results are obtained with said antibiotic combination wherein the ratio of novobiocin sodium to neomycin salicylidene is 1:5, 1:1, 5:1 and 10:1.

*Example 6.—Engine fuel JP–4 plus anti-icer*

90 parts by weight of ethylene glycol monomethylether and 10 parts by weight of glycerol are well mixed. An antibiotic combination is prepared by blending novobiocin sodium and neomycin salicylidene in the ratio of one part to one part. Fifty parts of the said antibiotic combination are added to one million parts of the anti-icer, and the whole is uniformly mixed.

A fuel, anti-icer and antibiotic composition is prepared by adding one volume of the anti-icer and antibiotic mixture to nine volumes of the fuel.

In the final composition microbial propagation is prevented, and there is no sludge or gum formation. In jet engine equipment icing is prevented. Effective, efficient combustion of the fuel is obtained in the jet engine.

What is claimed is:

1. A composition comprising a petroleum distillate fuel and a microbicidal amount of an antibiotic combination selected from the group consisting of novobiocin sodium and neomycin salicylidene, novobiocin and circulin sulfate, porfiromycin and neomycin salicylidene, and porfiromycin and circulin sulfate.

2. An improved petroleum distillate fuel having incorporated therein from about one to about 10 parts per million of an antibiotic combination selected from the group consisting of novobiocin sodium and neomycin salicylidene, novobiocin and circulin sulfate, porfiromycin and neomycin salicylidene, and porfiromycin and circulin sulfate.

3. The fuel of claim 2 wherein the ratio of individual components in the antibiotic combination varies from 1:10 to 10:1 by weight.

4. The fuel of claim 2 wherein the ratio of individual components in the antibiotic combination is 1:1 by weight.

5. A composition formed of an anti-icer and an antibiotic combination which will produce anti-icing and antimicrobial action when introduced into petroleum distillate fuel, the composition comprising a combination of liquid anti-icer and an antibiotic member selected from the group consisting of novobiocin sodium and neomycin salicylidene, novobiocin and circulin sulfate, porfiromycin and neomycin salicylidene, and porfiromycin and circulin sulfate mixed into a uniform liquid.

References Cited by the Examiner

UNITED STATES PATENTS

| 2,908,680 | 10/1959 | Gillin | 167—65 |
| 2,975,042 | 3/1961 | Summers | 44—50 |
| 2,975,043 | 3/1961 | Ambrose | 44—50 |
| 3,032,971 | 5/1962 | Shotton | 44—56 |

OTHER REFERENCES

"Porfiromycin," Cancer Chemotherapy Reports, No. 30, July 1963, compiled by Leone R. Duvall.

"The Pfizer Handbook of Microbial Metabilities," Max Miller, copyright 1961, pages 317 and 416.

DANIEL E. WYMAN, *Primary Examiner.*

Y. H. SMITH, *Assistant Examiner.*